(12) United States Patent
Patel et al.

(10) Patent No.: US 12,084,052 B2
(45) Date of Patent: Sep. 10, 2024

(54) SYSTEM AND METHOD OF PREDICTING AND DISPLAYING A SIDE BLIND ZONE ENTRY ALERT

(71) Applicant: GM Global Technology Operations LLC, Detroit, MI (US)

(72) Inventors: Dhruv Patel, Oshawa (CA); Joseph F. Szczerba, Grand Blanc, MI (US); Shiv G. Patel, North York (CA); Daniel S. Glaser, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 332 days.

(21) Appl. No.: 17/714,409

(22) Filed: Apr. 6, 2022

(65) Prior Publication Data

US 2023/0322215 A1    Oct. 12, 2023

(51) Int. Cl.
*B60W 30/095*    (2012.01)
*B60K 35/00*    (2024.01)
*B60K 35/28*    (2024.01)
*B60W 50/14*    (2020.01)

(52) U.S. Cl.
CPC ......... *B60W 30/0956* (2013.01); *B60K 35/00* (2013.01); *B60W 50/14* (2013.01); *B60K 35/28* (2024.01); *B60K 2360/177* (2024.01); *B60W 2050/143* (2013.01); *B60W 2050/146* (2013.01); *B60W 2540/225* (2020.02); *B60W 2552/10* (2020.02); *B60W 2554/4041* (2020.02); *B60W 2554/4042* (2020.02); *B60W 2554/4044* (2020.02); *B60W 2554/4045* (2020.02)

(58) Field of Classification Search
CPC ............. B60W 30/0956; B60W 50/14; B60W 2050/143; B60W 2050/146; B60W 2554/4041; B60W 2554/4042; B60W 2554/4044; B60W 2554/4045; B60W 2540/225; B60W 2552/10; B60K 35/28; B60K 2360/177
See application file for complete search history.

(56) References Cited

U.S. PATENT DOCUMENTS 9,925,920 B2 * 3/2018 Lei .................. G08G 1/167
10,106,154 B2 * 10/2018 Nguyen Van ......... B60W 30/08
2017/0192091 A1 * 7/2017 Felix .................. G01S 13/42

* cited by examiner

*Primary Examiner* — Huan Le
(74) *Attorney, Agent, or Firm* — Vivacqua Crane, PLLC

(57) ABSTRACT

A system and method of predicting a target vehicle entry into a side blind zone of an ADAS equipped vehicle and displaying a real-time alert to inform an operator or occupant of the ADAS equipped vehicle of the predicted target vehicle entry into the side blind zone. The system includes exterior sensors, interior sensors, an augmented reality rearview mirror, and a module. The module is configured to detect an object behind the ADAS equipped vehicle, predict a path of the object, determine a probability that the predicted path of the object will enter a side blind zone of the vehicle, and determine an entry of the object into the side blind zone of the vehicle when the probability exceeds a predetermined threshold.

15 Claims, 5 Drawing Sheets

SYSTEM AND METHOD OF PREDICTING AND DISPLAYING A SIDE BLIND ZONE ENTRY ALERT

INTRODUCTION

The present disclosure relates to Advanced Driver Assistance System equipped vehicles, more specifically to a system and method of predicting an entry of a target vehicle into a blind zone of a host vehicle and displaying an alert of the predicted blind zone entry.

Advanced Driver Assistance Systems (ADAS) are intelligent systems that reside onboard a vehicle and used to enhance or automate functions of vehicle systems to increase the driving performance of the vehicle operator, as well as enhancing the safety of the vehicle occupants. A typical ADAS includes a control module that is in communication with various vehicle exterior and interior sensors, vehicle state sensors, and vehicle systems such as steering, acceleration, braking, and safety systems. The control module analyzes information gathered by the vehicle sensors to generate and communicates instructions to the vehicle systems for partial or full autonomous control of the vehicle in accordance with the levels of autonomous driving as provided in SAE J3016 publication and to enhance vehicle and occupant safety.

A function of the safety system of an ADAS equipped vehicle may include the continuous monitoring of blind zones, also commonly known as blind spots, surrounding a portion of an exterior of the vehicle. Typical blind zones can be found on either side of the vehicle, starting approximately at the position of the driver and extending backwards sometimes beyond the rear of the vehicle, where other vehicles or objects may be hidden from view of the vehicle operator. The extent of the blind zones depends on the adjustment of the angle of the exterior side mirrors and the interior rearview mirror of the vehicle. The ADAS control module and/or a dedicate safety control module is in communications with exterior sensors to continuously monitor the immediate surrounding of vehicle to detect vehicles or objects presently in the blind zones. Once an object or vehicle is detected within the blind zone of the vehicle, a visual alert, such as a flashing indicator light located in the side mirror adjacent the blind zone, is activated to alert the operator of the vehicle that a potential vehicle or object may be currently inside the blind zone.

Thus, while continuous monitoring of the blind zones for vehicles or objects currently within a blind zone achieve their intended purpose, there is a need for continuous improvement to enhance the quality of experience of the vehicle operator and safety of the occupants.

SUMMARY

According to several aspects, a method of predicting and displaying a blind zone entry alert for a host vehicle is provided. The method includes collecting information, by an exterior sensor, on an external area surrounding the host vehicle; analyzing the collected information, by a module, for detecting a target vehicle, predicting a path of the target vehicle, and determining a probability that the predicted path of the target vehicle will enter a predetermined blind zone of the host vehicle; and initiating an alert, by the module, to an occupant of the host vehicle when the determined probability exceeds a predetermined threshold value.

The alert may include an audial alert or a visual alert displayed on a rearview display monitor configured to function as a rearview mirror. The visual alert may include a color indicator referencing the target vehicle. The color indicator may include one or more of a first color when the determined probability is between a first predetermined value range, a second color when the determined probability is between a second predetermined value range, and a third color when the determined probability is between a third predetermined value range.

In an additional aspect of the present disclosure, the external area surrounding the host vehicle is an area rearward of the host vehicle. The predetermined blind zone is a side blind zone of the host vehicle.

In another aspect of the present disclosure, predicting the path of the target vehicle includes detecting at least one driving dynamic of the target vehicle, wherein the at least one driving dynamic includes one or more of a roadway position, a velocity, a change in velocity, and a trajectory; and comparing the at least one driving dynamic of the target vehicle with a corresponding at least one driving dynamic of the host vehicle.

In another aspect of the present disclosure, determining the probability that the predicted path of the target vehicle will enter a predetermined zone of the host vehicle, includes determining at least one driving behavior of the target vehicle; assigning a predetermined probability value to each of the at least one driving behavior; and summing the predetermined probability value.

In another aspect of the present disclosure, the at least one driving behavior includes at least one of a speed greater than a predetermined speed, a multiple lane change, a lane change from a host vehicle lane with an increase in speed, remain in lane behind the host vehicle with a decrease in speed, and a tailgating event over a predetermined time.

In another aspect of the present disclosure, the method may further include determining a lane change initiative by the host vehicle and implementing the method starting at analyzing the collected information when the lane change initiative is determined. The lane change initiative may include a turn signal activation, or a command issued by an advanced driver assistance system module.

In another aspect of the present disclosure, the method may further include collecting occupant information, by interior sensors, on an eye glance of a vehicle operator; analyzing the collected occupant information, by the module, and determining whether the vehicle operator is glancing at a rearview mirror; and implementing the method starting at analyzing the collected information on an external area surrounding the host vehicle when the vehicle operator is glancing at the rearview mirror.

According to several aspects, a predictive side blind zone entry system for an advanced driver assistance system (ADAS) equipped vehicle is provided. The predictive side blind zone entry system includes at least one exterior sensor configured to gather exterior data on a rearward area surrounding of the ADAS equipped vehicle; a module configured to analyze the gathered exterior data to detect an object and determine a probability that the object will enter a predetermined blind zone of the ADAS equipped vehicle; and a human machine interface (HMI) configured to issue an alert to notify an occupant of the ADAS equipped vehicle when the determined probability exceeds a predetermined probability threshold.

In an additional aspect of the present disclosure, the at least one interior sensor configured to collect occupant information on an eye glance of an ADAS equipped vehicle operator. The module is further configured analyzes the collected occupant information to determine whether the eye glance of the ADAS equipped vehicle operator is in a direction toward the rearview display monitor.

In another aspect of the present disclosure, the module is further configured to instruct the rearview display monitor to render a color indicator referencing a target vehicle detected in the rearward area surrounding of the host vehicle. The color indicator is assigned a predetermine color corresponding to a predetermined probability that the target vehicle will enter the side blind zone.

According to several aspects, a method of predicting a side blind zone entry for a vehicle is provided. The method includes detecting an object located behind the vehicle; predicting a path of the object relative to the vehicle; determining a probability that the predicted path of the object will enter a side blind zone of the vehicle; and determining an entry of the object into the side blind zone of the vehicle when the probability exceeds a predetermined threshold.

In an additional aspect of the present disclosure, the determining the probability that the predicted path of the object will enter the side blind zone of the vehicle, includes one or more of assigning a first probability value when the speed of the object exceeds a predetermined speed; assigning a second probability value when the trajectory of the object exhibits a multiple lane change; assigning a third probability value when the trajectory of exhibits a lane change from immediately behind the vehicle; assigning a fourth probability value when the change in speed of the object deceases above a predetermined deceleration rate within the same lane of the vehicle; assigning a fifth probability value when the object is tailgating the vehicle for greater than a predetermined time period; summing the assigned probability values; and generating a first blind zone alert when the sum of the assigned probability values exceeds a first predetermined threshold.

In another aspect of the present disclosure, the method further includes generating a second blind zone alert when the sum of the assigned probability values exceeds a second predetermined threshold. The first blind zone alert and the second blind zone alert are displayed as a first color and a second color, respectively, on an augmented reality rearview display unit such as an augmented reality rearview mirror.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
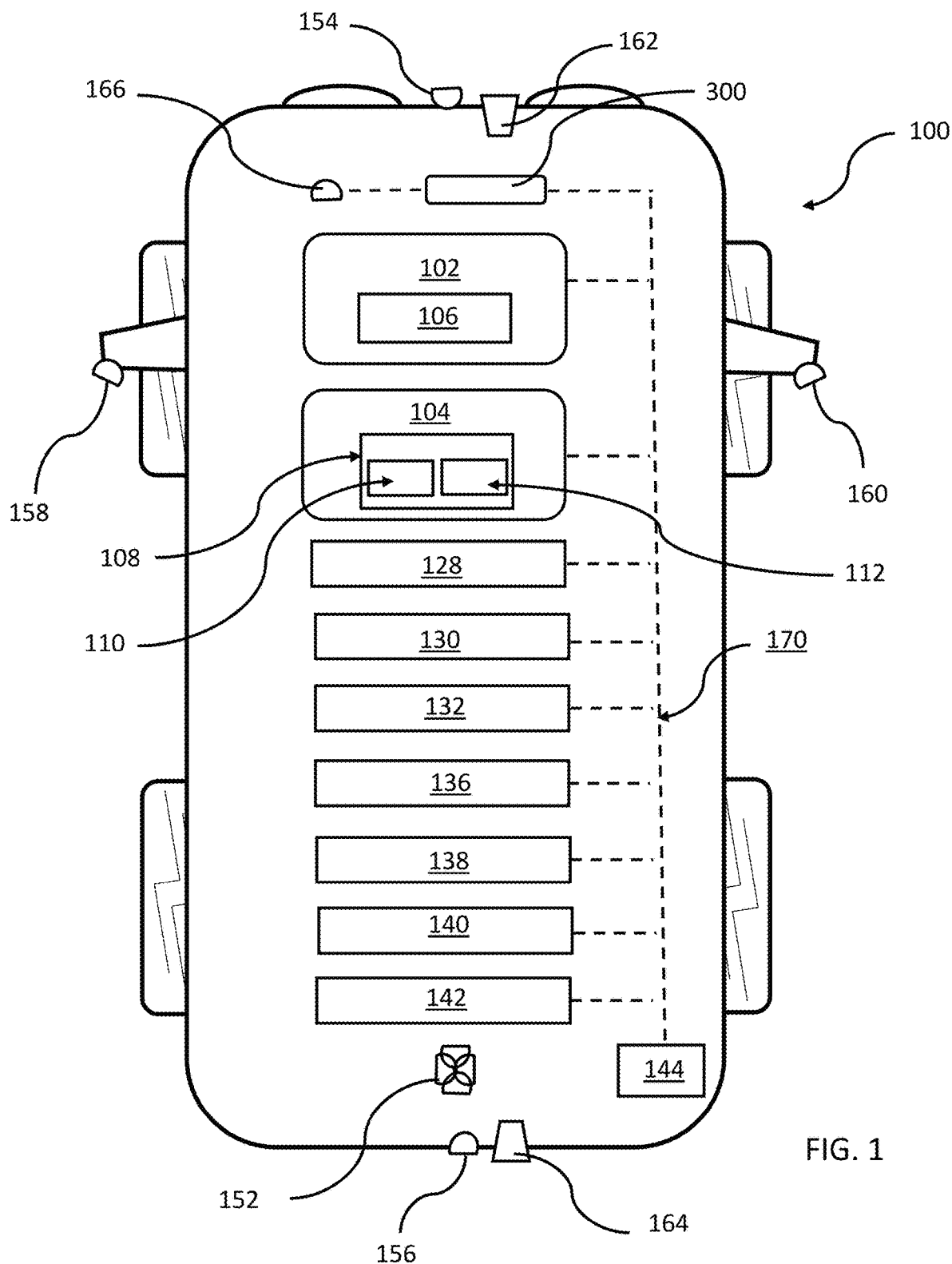
FIG. 1 is a functional block diagram of an Advanced Driver Assistance System (ADAS) equipped vehicle having a Predictive Side Blind Zone Alert System (PSBZAS), according to an exemplary embodiment.

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

As used herein, the term "module", "control module", "controller", "controller module", or the likes, refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The following disclosure provides a system and method of predicting a target vehicle entry into a predetermined blind zone of a host vehicle and displaying a real-time alert to inform an operator or occupant of the host vehicle of the predicted target vehicle entry into the predetermined blind zone. The exemplary predetermined blind zone presented in the disclosure is a side blind zone, it should be appreciated that the system and method are not limited to a side blind zone and may include any blind zones typically found surrounding the host vehicle.

FIG. 1 shows a functional block diagram of an exemplary host vehicle 100 equipped with an Advanced Driver Assistance System (ADAS 102) having a Predictive Side Blind Zone Alert System (PSBZAS 104). The ADAS 102 includes an ADAS control module 106 configured to cooperate with various operating systems of vehicle 100, such as a detection system 128, an acceleration system 130, a steering system 132, a navigation system 136, a positioning system 138, a deceleration system 140, communication system 142, and other vehicle systems necessary to provide a range of driving modes from partial autonomous mode to full autonomous mode in accordance with SAE International SAE J3016_202104 publication, "Taxonomy and Definitions for Terms Related to Driving Automation Systems for On-Road Motor Vehicles".

Lower levels of driving modes can include a range of dynamic driving and vehicle operations including some level of automatic control or intervention related to simultaneous automatic control of multiple vehicle functions, such as steering, acceleration, and braking, wherein the operator retains partial control of the vehicle. Higher levels of driving mode can include fully automatic control of all vehicle driving functions, including steering, acceleration, braking, and executing maneuvers such as automated lane changes, wherein the driver cedes most or all control of the vehicle for a period of time.

The detection system 128, acceleration system 130, steering system 132, navigation system 136, positioning system 138, deceleration system 140, communication system 142, and other necessary vehicles systems may include system specific control modules, electro-mechanical actuators, hardware, software, and other components that are configured to functionally integrate the vehicle systems with the ADAS 102. The system specific control modules (not shown) may be configured to communicate with the ADAS control module 106 and/or between other system specific control modules for the coordinated control of the host vehicle 100. Alternatively, the ADAS control module 106 may function as a primary control module for directly controlling all or working in combinations with the system specific control modules to control one or more of the detection system 128, acceleration system 130, steering system 132, navigation system 136, positioning system 138, deceleration system 140, communication system 142, and other vehicles systems necessary for providing the range of driving modes. The ADAS control module 106 is configured to receive vehicle dynamic data from the various vehicle systems and/or directly from vehicle state sensors 144 including, but not limited to, steering angle sensors, wheel speed sensors, braking sensors, and yaw, pitch, and roll sensors for determining the driving dynamics and path of the vehicle 100.

The detection system 128 is in communications with exterior sensors 152, 154, 156, 158, 160, 162, 164 configured to collect information on the external surrounding of the host vehicle. Examples of exterior sensors include, but are not limited to, optical laser devices such as a Light Detection and Ranging (LIDAR) device 152 configured for a 360 degree viewing about the host vehicle 100, a forward viewing camera 154, a rearward viewing camera 156, left and right sideview cameras 158, 160, and front and rear range sensors 162, 164 such as radar and sonar devices. The detection system 128 is also in communications with interior cabin sensors 166 configured to collect information on the vehicle operator and/or occupants. An example of an interior cabin sensor 166 includes a camera 166 configured to capture real time images of the facial features and behaviors of the vehicle operator, particularly the eye glances of the vehicle operator. One or more of the interior cabin sensors 166 and exterior sensors 152, 154, 156, 158, 160, 162, 164, may be equipped with localized data processing components, or the data gathered by the sensors may be processed by the ADAS and/or PSBZAS.

The vehicle communication system 142 is configured to wirelessly communicate information to and from other entities (vehicle-to-everything (V2X) communication). For example, the vehicle communication system 142 is configured to wirelessly communicate information to and from other similarly equipped vehicles ("V2V" communication), to and from driving system infrastructure ("V2I" communication), remote systems, and/or personal devices. Examples of driving system infrastructure include, but are not limited, a roadside unit (RSU). In an embodiment, the vehicle communication system 142 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The PSBZAS 104 includes a PSBZAS control module 108 configured to implement instructions to process information collected by the vehicle sensors, predict a probability of entry of an object or another vehicle, referred to as a target vehicle, into a predetermined blind zone of the vehicle 100, and generate an alert to notify the host vehicle operator of the predicted entry of the object or vehicle into the blind zone of the vehicle. Although only one PSBZAS control module 108 is shown in FIG. 1, alternative embodiments of the PSBZAS can include any number of PSBZAS control modules that communicate over any suitable communication medium or a combination of communication mediums and that cooperate to process the sensor signals, perform logic, calculations, methods, and/or algorithms, and generate control signals for predicting a target vehicle entry into a blind zone of a host vehicle and generating a real-time alert to inform an operator of the host vehicle of the predicted target vehicle entry into the blind zone of the host vehicle. In yet another embodiment of the PSBZAS, the functions of the PSBZAS control module may be performed partially or completely by the ADAS control module.

The PSBZAS control module 108 includes at least one processor 110 and a computer readable storage device 112. The computer readable storage device 112 may also be referred to a computer readable media and a computer readable medium. The processor 110 can be any custom made or commercially available processor, a central processing unit (CPU), a graphics processing unit (GPU), an auxiliary processor among several processors associated with the PSBZAS control module 108, a semiconductor-based microprocessor (in the form of a microchip or chip set), a macroprocessor, any combination thereof, or generally any device for executing instructions.

The computer readable storage device 112 may include volatile and nonvolatile storage in read-only memory (ROM), random-access memory (RAM), and keep-alive memory (KAM), for example. KAM is a persistent or non-volatile memory that may be used to store various operating variables while the processor 110 is powered down. The computer-readable storage device 112 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the PSBZAS control module 108 in controlling the vehicle 100.

The algorithm may include one or more separate programs, each of which comprises an ordered listing of executable instructions for implementing logical functions. The instructions, when executed by the processor 110, receive and process signals from the various vehicle systems including the vehicle detection system 128, perform logic, calculations, methods and/or algorithms for detecting an object or target vehicle, calculate a probability of the object or target vehicle entering a predetermined blind zone of the host vehicle, and generating an alert informing the operator of the predicted blind zone entry based on the logic, calculations, methods, and/or algorithms.

Communications between the ADAS and PSBZAS control modules 106, 108 and the vehicle systems 128, 130, 132, 136, 138, 140, 142, interior sensors, exterior sensors, and state sensors may be implemented by using a direct wired point-to-point link, a networked communication bus link, a wireless link or another suitable communication link 170. Communication includes exchanging data signals in suitable form, including, for example, electrical signals via conductive medium, electromagnetic signals via air, optical signals via optical waveguides, and the like. The data signals may include discrete, analog, or digitized analog signals representing inputs from sensors, actuator commands, and communication between vehicle systems and modules.

Figure 2:
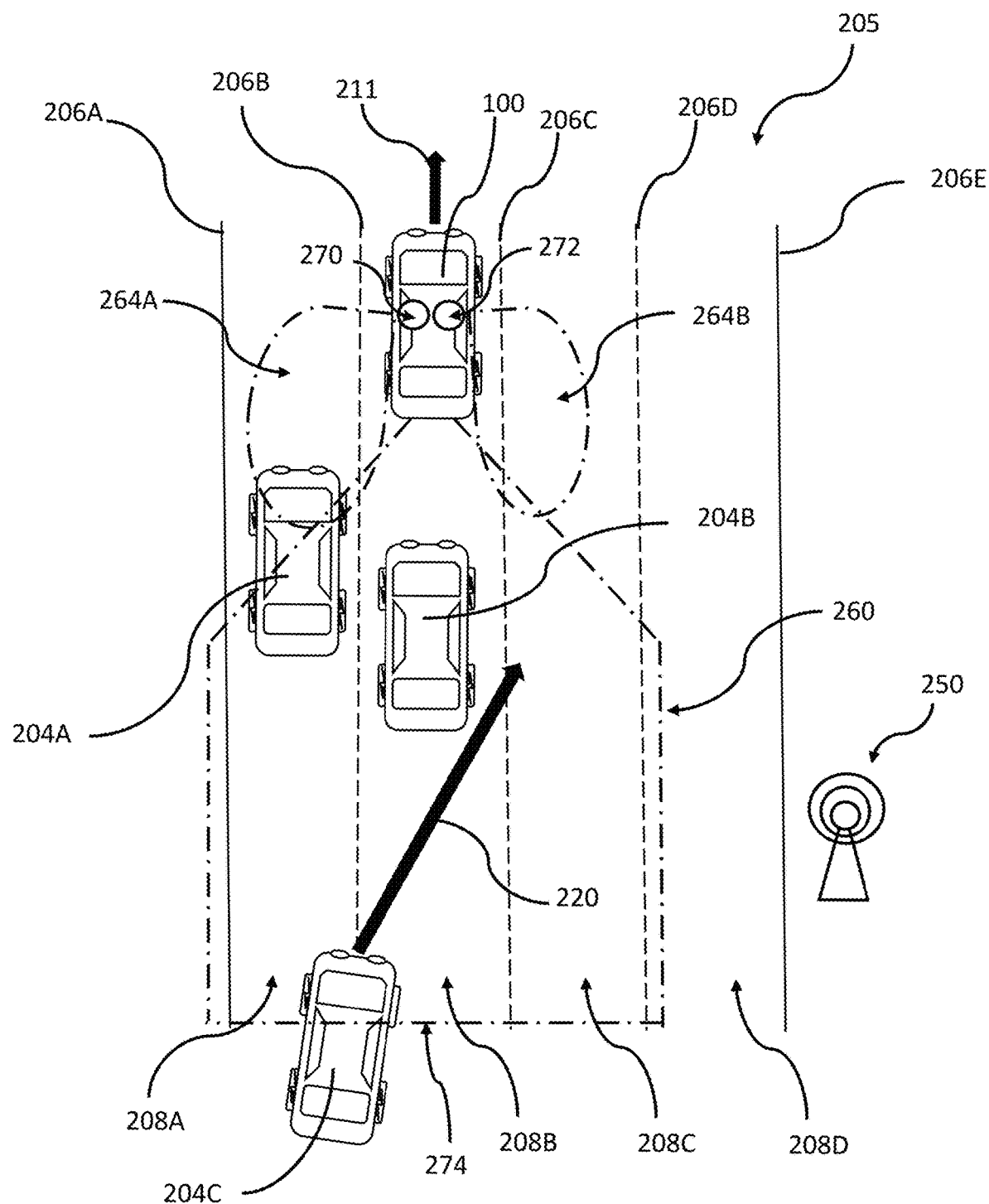
FIG. 2 is a diagram of a plan view of the ADAS equipped vehicle of FIG. 1 operating on a roadway, according to an exemplary embodiment.

FIG. 2 is an illustration of a plan view of the ADAS equipped host vehicle 100 having a PSBZAS 104 and a plurality of target vehicles 204a, 204b, 204c traveling on a multi-lane roadway 205. The multi-lane roadway 205 is defined by a plurality of parallel lane markers 206A, 206B, 206C, 206D, 206E. A first lane 208A, a second lane 208B, a third lane 208C, and a fourth lane 208E are defined between pairs of respective adjacent lane markers 206A, 206B, 206C, 206D, 206E.

The host vehicle 100 is shown traveling in a forward direction 211 within the second lane 208B. The first target vehicle 204A is shown traveling in the forward direction 211 within the first lane 208A adjacent to the second lane 208B behind the host vehicle 100. The second target vehicle 204B is shown traveling in the forward direction 211 behind the host vehicle 100. The third target vehicle 204C is shown transitioning from the first lane 208A to the third lane 208C in direction of the arrow 220.

The PSBZAS 104 of the host vehicle 100 is configured to continuously monitored the target vehicles 204A, 204B, 204C located in a rearward zone 260 located behind the host vehicle 100. A non-limiting example of the rearward zone 260 is that of an area 260 behind the host vehicle 100 that can be viewed in a typical rearview mirror and/or detectable by one or more of the exterior sensors of the detection system 128 configured to gather surrounding information rearward of the host vehicle 100. Such exterior sensors may include the rearward directed LIDAR 152, rear view camera 156, and rear mounted proximity sensors 164. The rear view camera 156 may include infrared cameras for operations at night and inclement weathers.

The PSBZAS control module 108 is configured to analyze the data collected by the one or more of the exterior sensors of host vehicle detection system 128. The PSBZAS control module 108 is also in communication with the communication system 142 of the host vehicle to receive real time traffic data provided by a roadside unit 250 and/or by a V2V equipped target vehicles. The real time traffic data may include the locations, or roadway positions, of the host vehicle 100 and any surrounding target vehicles 204A, 204B, 204C. The collected data is analyzed to determine the driving dynamics such as roadway position, velocity, direction or trajectory, and other driving behaviors of each target vehicles 204A, 204B, 204C for calculating a probability or likelihood that a target vehicle will enter one or more predetermined blind zones 264A, 264B of the host vehicle.

In a non-limiting example, a pair of predetermined blind zones 264A, 264B are defined on either side of the host vehicle 100, starting approximately at the sitting position of the driver 270 or front occupant 272 and extending backwards to a distal limit 274 beyond the rear of the host vehicle 100. For a typical on road passenger vehicle, the side blind zone starts at each exterior side mirror and extends rearward approximately 16 feet. When a prediction is made that a target vehicle 204A, 204B, 204C exceeds a predetermined probability threshold that the target vehicle will be entering a blind zone of the host vehicle, the PSBZAS 104 generates an alert.

The alert may be that an audio or visual alert to notify the operator of the host vehicle 100 that there is a highly probability that a target vehicle will be or is entering into a blind zone of the host vehicle. The visual alert may be that of colored indicator overlaid on an image of the target vehicle displayed on a human machine interface (HMI) 300 such as an instrumental panel display, an infotainment display, or a rearview mirror display. The visual alert provide advanced warning prior to, and in conjunction with, the side blind zone visual alert indicators typically located in the right/left exterior rearview mirrors. When the host vehicle 100 is driving in partial to full automated modes, the visual alert will serve as additional information to the vehicle operator in order to build confidence and trust in the ADAS 102, as well as provide context to why an ADAS 102 initiated automated lane change maneuver is cancelled or delayed.

Figure 3A:
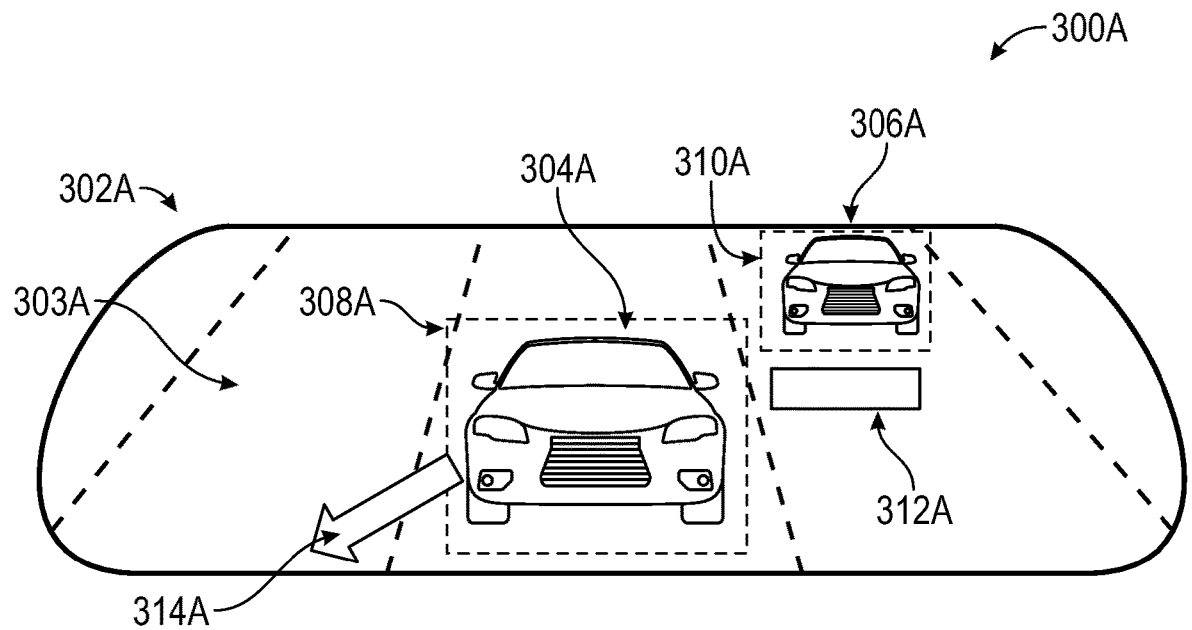
FIG. 3A is a diagram of an exemplary embodiment of an augmented reality rearview display unit.
Figure 3B:
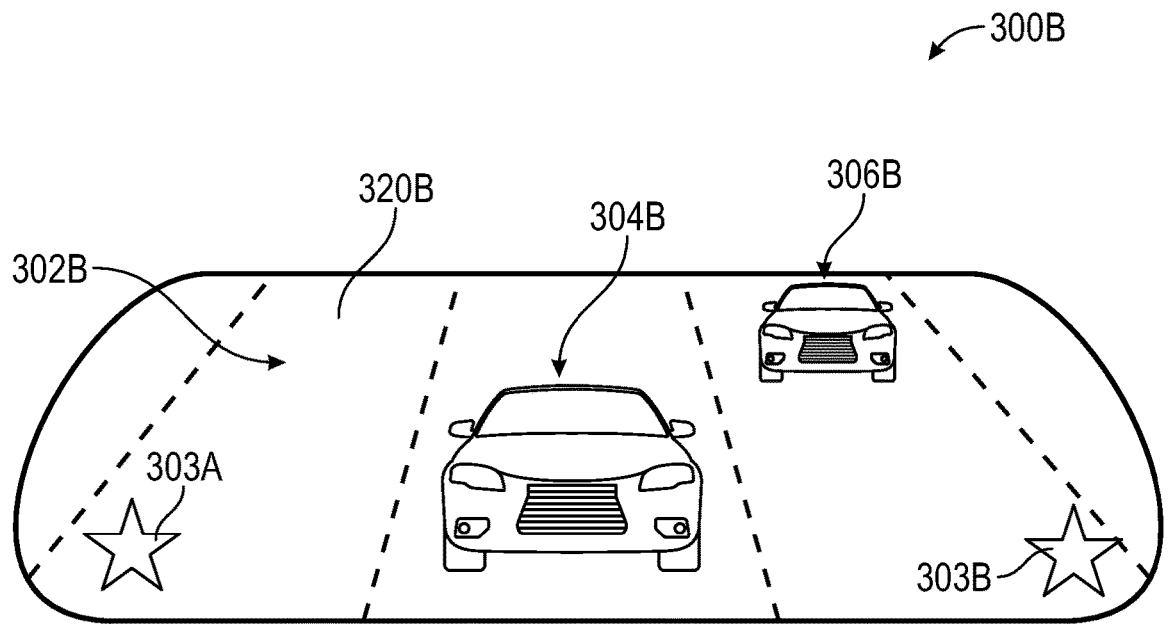
FIG. 3B is a diagram of another embodiment of an exemplary augmented reality rearview display unit.

Shown in FIGS. 3A, 3B are non-limiting examples of a HMI 300 in the form of an augmented reality rearview display unit 300A, 300B such as a rearview mirror unit 300A, 300B configured to display a real time mirror image of an immediate rearward view of the host vehicle 100. The real time mirror image of the rearward view is selectively augmented with visual indicator alerts when a target vehicle 304A, 306A is determined to exceed a predetermined probability threshold of entering a predetermined blind zone of the host vehicle 100. The rearview mirror unit 300 may be placed inside a passenger compartment of the host vehicle 100 forward of the vehicle operator, preferably near the longitudinal centerline of the host vehicle 300 where a rearview mirror of a passenger vehicle would be typically located.

Referring to FIG. 3A, in one embodiment, the rearview mirror unit 300 is a rearview display monitor 300A configured to display a real time mirror image of the rearward area behind the host vehicle 100. Data gathered by the rearward directed exterior vehicle sensors, such as the rear view camera 156, is processed by the ADAS control module 106 and/or PSBZAS control module 108 to generate the real time mirror image of the rearward area 302A behind the host vehicle 100. In the example shown, the mirror image of the rearward area 302A shows two target vehicles 304A, 306A. The target vehicles 304A, 306A behind the host vehicle 100 are continuously tracked by the PSBZAS control module 108 to determine the likelihood of whether the target vehicles 304A, 306A will enter a blind zone of the host vehicle. The PSBZAS control module 108 selectively augment the mirror image of the rearward area 302A with visual indicator alerts 308A, 310A, 312A next to the target vehicles 304A, 306A indicating a relative probability of entering the predetermined blind zone of the host vehicle.

For example, a bracket indicator 308A, 310A may be displayed around the target vehicles 304A, 306A to indicate that one or more of the target vehicle 304A, 306A are currently being tracked by the PSBZAS 104. A bar indicator 312A may be display referencing the target vehicles 304A, 306A in lieu of or in conjunction with the bracket indicator 308A, 310A. The bracket indicator 308A, 310A and bar indicator 312A may be colored coded to indicate the likelihood, or relative probability, that a target vehicle will be entering a blind zone of the host vehicle. For example, a green color may indicate a target vehicle has a low probability, an amber color may indicate a higher probability, and a red color may indicate an imminent entry of the target vehicle into a blind zone. In addition, a directional vector indicator 314A may be displayed adjacent to a target vehicle 304A to indicate a predicted trajectory or path of the tracked target vehicle 304A.

In another embodiment, the rearview display unit may be that of a rearview mirror 300B having a translucent mirror layer 320B placed onto a visual alert generator 322B. The translucent mirror layer is functional to provides a reflection of an immediate rearward view 302B of the host vehicle and allows for light produced by the visual alert generator 322B to penetrate from behind the translucent mirror layer 320B. The visual alert generator is configured to emit a sufficiently bright image that would be displayed through the translucent mirror layer, thereby augmenting the immediate rearward view. The visual alert generator may include light emitting diodes (LED) and/or visual display monitors located behind the translucent mirror layer. In this embodiment, indicator alerts 303A, 303B may be selectively displayed on the left and right sides of the rearward viewing unit 300B to indicate a potential entry of a target vehicle into the right or left blind zones of the host vehicle 100. The indicator alert 303A, 303B may be color coded to indicate the likelihood of entry into the blind zone. For example, an amber color indicates a likelihood of entry, and a red color indicates an imminent entry.

Figure 4:
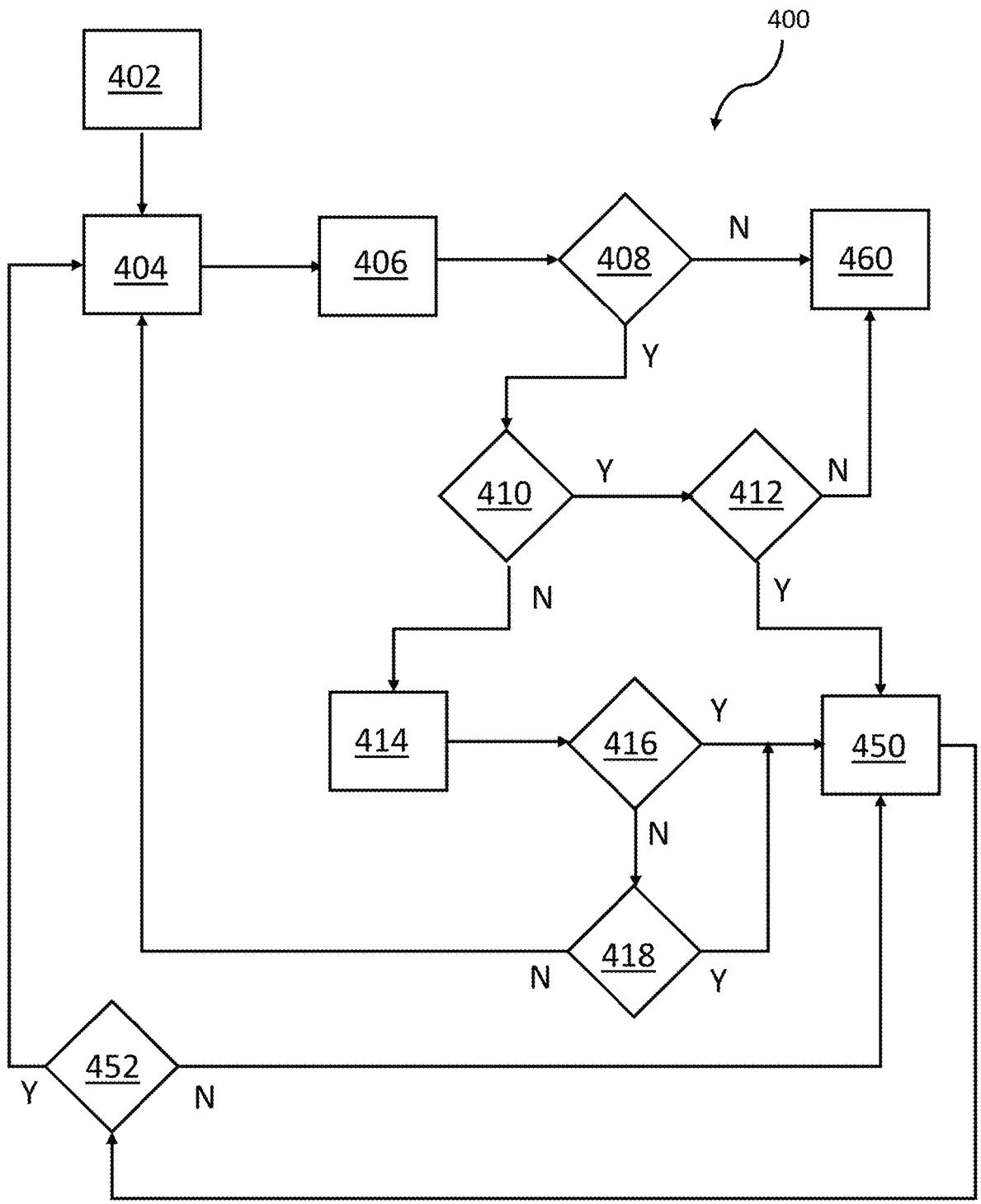
FIG. 4 is a block flowchart of a method of predicting an entry of a target vehicle into a blind zone of a host vehicle and displaying an alert of the predicted blind zone entry, according to an exemplary embodiment.

FIG. 4 shows a block flowchart of a method of predicting an entry of a target vehicle into a blind zone of a host vehicle and displaying an alert of the predicted blind zone entry (Method 400). Referring to FIGS. 1, 2, 3, and 4, the Method 400 starts in Block 402 when an ADAS equipped host vehicle 100 having a PSBZAS 104 is in operating mode. For example, the ADAS equipped host vehicle 100 is traveling on a roadway as shown in FIG. 2 in an autonomous level ranging from partial to fully autonomous mode. The ADAS 102 continuously determines the driving dynamics and trajectory of the host vehicle 100. Moving to Block 404 from Block 402.

In Block 404, the exterior sensors of the host vehicle 100 collect information on an external area surrounding the host vehicle 100. The PSBZAS control module 108 analyzes the collected information to identify any target vehicles, or other objects, behind the host vehicle 100. When a target vehicle or object is identified, the PSBZAS control module 108 further analyze the collected information to determine at least one driving dynamic such as a roadway position, a velocity, a change in velocity, and trajectory of the target vehicle, and other predetermined relevant behaviors of the target vehicle to determine a probability that the target vehicle is moving into the blind spot of the host vehicle. Moving to Block 406 from Block 404.

Figure 5:
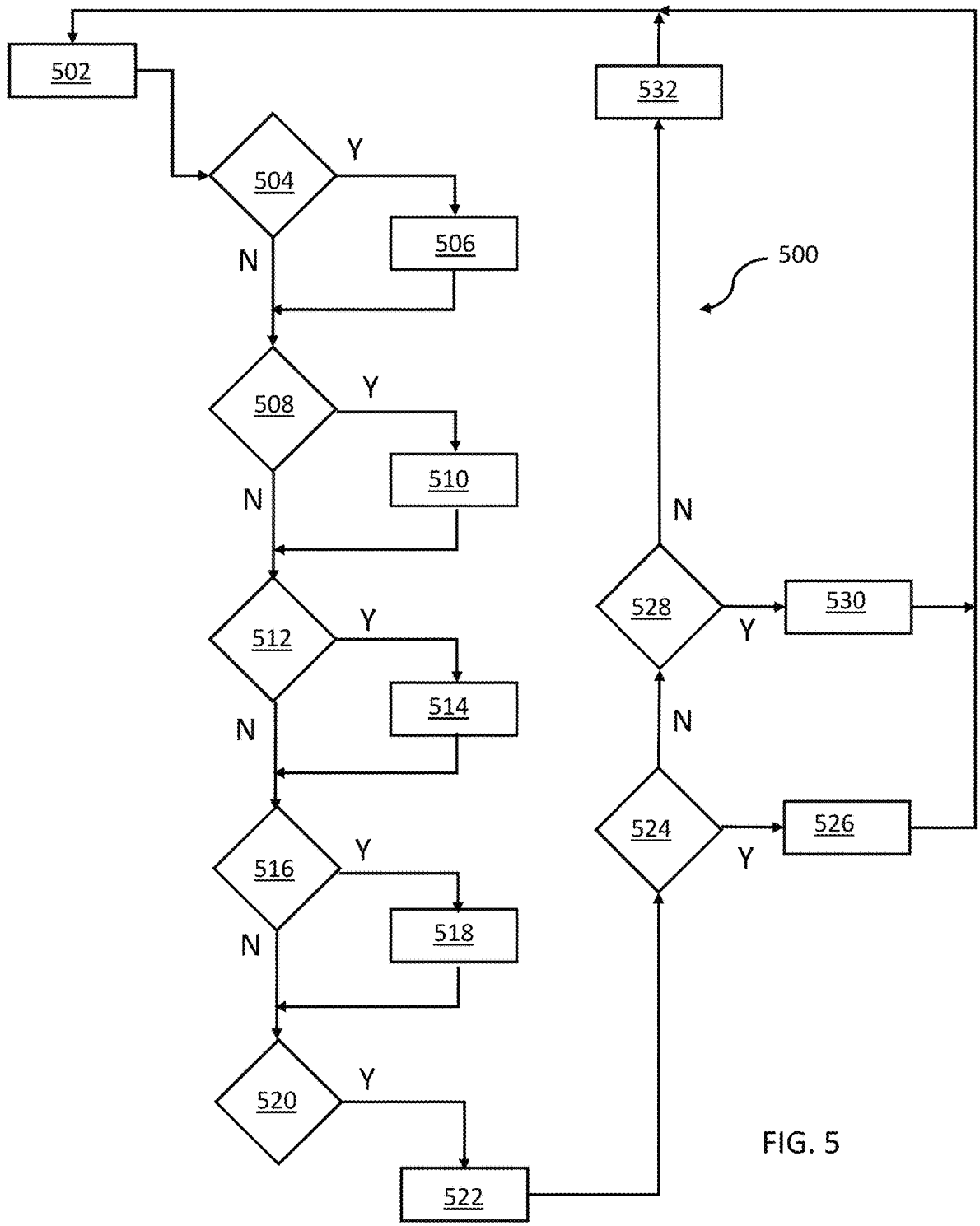
FIG. 5 is a block flowchart of a method of determining a probability of a target vehicle entering a blind zone of the host vehicle, according to an exemplary embodiment.

In Block 406, the PSBZAS control module 108 analyzes the roadway position, velocity, change in velocity, directional vector or trajectory, and other predetermined relevant behavior of the target vehicle to determine a probability that a target vehicle will be entering a predetermined blind zone within a predetermined time period. For example, the predetermined time period may be within the next 5 to 8 seconds, the time that a vehicle operator should check their rearview mirror. An exemplary method of determining a probability of a target vehicle entering a predetermined blind zone of the host vehicle is shown in FIG. 5. Moving to Block 408 from Block 406.

In Block 408, the PSBZAS control module 108 determines whether the determined probability exceeds a predetermined probability threshold value. If the determined probability does not exceed the predetermined probability threshold value, then the Method 400 proceeds to Block 460. In Block 460, no alert is generated by the PSBZAS 104.

Referring back to Block 408, if the determined probability exceeds the predetermined probability threshold value, then the Method 400 proceeds to Block 410. In Block 410, the PSBZAS control module 108 determines whether the host vehicle 100 is operating above a predetermined autonomous mode. If the host vehicle is operating above a predetermined autonomous mode, then the Method 400 proceeds to Block 412.

In Block 412, the PSBZAS control module 108 determines whether an automated lane change request has been initiated by the ADAS 102. When an automatic lane change request has not been initiated by the ADAS 102, the Method 400 proceeds to Block 460. In Block 460, no alert is generated by the PSBZAS 104.

Referring back to Block 412, when an automatic lane change request has been initiated by the ADAS, the Method 400 proceeds to Block 450. In Block 450, the PSBZAS control module 108 generates an augmented visual alert on a rearview mirror display highlighting the target vehicle. Moving to Block 452 from Block 450.

In Block 452, the PSBZAS control module 108 determines whether a lane change maneuver has been completed by the ADAS 102. When a lane change maneuver has not been completed by the ADAS, the Method 400 proceeds to Block 450. In Block 450, the PSBZAS control module 108 generates an augmented visual alert on a rearview mirror display highlighting the target vehicle.

Referring back to Block 452, the PSBZAS control module 108 determines whether a lane change maneuver has been completed by the ADAS. When a lane change maneuver has been completed by the ADAS, the Method 400 proceeds to back to Block 404 and the Method 400 continues.

Referring back to Block 410. In Block 410, the PSBZAS control module 108 determines whether the host vehicle is operating above a predetermined autonomous mode. When the host vehicle is not operating above the predetermined autonomous mode, then the Method 400 proceeds to Block 414.

In Block 414, the interior cabin sensor 166 of the host vehicle 100 collects information on the behavior of the vehicle operator. The PSBZAS control module 108 analyzes the collected information to determine a direction of glance of the vehicle operator and determines whether the vehicle operator is glancing at the rearview mirror unit 300. Moving to Block 416 from Block 414.

In Block 416, when the PSBZAS control module 108 determines the vehicle operator is glancing at the rearview mirror, the Method 400 proceeds to Block 450. In Block 450, the PSBZAS control module 108 generates an augmented visual alert on a rearview mirror display highlighting the target vehicle and the Method continues to Block 452.

Referring back to Block 416, if the vehicle operator is not glancing at the rearview mirror, then the Method 400 proceeds to Block 418. In Block 418, the PSBZAS control module 108 determines whether the turn indicator is activated. If the turn indicator is activated, the method moves to Block 450. In Block 450, the PSBZAS control module 108 generates an augmented visual alert on a rearview mirror display highlighting the target vehicle and the Method continues to Block 452.

Referring back to decision Block 418, if the turn indicator is not activated, the method moves to Block 404 and the Method 400 continues.

FIG. 5 shows a block flowchart of a method of determining a probability of a target vehicle entering a predetermined blind zone of the host vehicle (Method 500). The Method 500 begins in Block 502. In Block 502 The PSBZAS control module 108 monitors target vehicles located rearward of the host vehicle and determines the roadway position, velocity, lane change behavior, acceleration change, and tailgating behavior of a target vehicle. Moving to Block 504 from Block 502.

In Block 504, for a monitored target vehicle, the PSBZAS control module 108 determines whether the approach speed of the target vehicle is greater than a predetermined approach speed threshold. If the approach speed of the target vehicle is greater than the predetermined approach speed threshold, then a first probability value is assigned to the monitored target vehicle in Block 506. Moving to Block 508.

In Block 508, the PSBZAS control module 108 determines whether the monitored target vehicle exhibits a multiple lane change behavior. When a multiple lane change behavior is determined, a second probability value is assigned to the monitored vehicle in Block 510. Moving to Block 512.

In Block 512, the PSBZAS control module 108 determines whether the monitored target vehicle changed lane from host vehicle's lane and initiated acceleration. When the monitored target vehicle changed lane from driver's lane and initiated acceleration is determined, a third probability value is assigned to the monitored vehicle in Block 514. Moving to Block 516.

In Block 516, the PSBZAS control module 108 determines whether the monitored target vehicle decelerated above a predetermined deceleration rate in the same lane as the host vehicle. When the monitored target vehicle decelerated above a predetermined deceleration rate in the same lane as the host vehicle is determined, a fourth probability value is assigned to the monitored vehicle in Block 518. Moving to Block 520.

In Block 520, the PSBZAS control module 108 determines whether the monitored target vehicle has been traveling at a less than safe distance behind the host vehicle, also known as tailgating, over a predetermined amount of time. A safe driving distance is variable by speed and may be measured by time. For example, whatever speed the host vehicle and target vehicles are traveling together, the target vehicle traveling 3 seconds or more behind the host vehicle ahead is considered a safe distance, or a non-tailgating event. A target vehicle traveling anything less than 3 seconds behind the host vehicle at any given speed may be considered a tailgating event. The tailgating event could be considered if a target vehicle was in this position for 5 seconds or more. For example, if the host vehicle has less than a 3 second lead time over a target vehicle, and the target vehicle maintain this relationship for over 5 seconds, then a fifth probability value is assigned to the monitored vehicle in Block 518. Moving to Block 522.

In Block 522, the PSBZAS control module 108 sums up the assigned predetermined probability values from Blocks 506, 510, 514, and 518. Moving to Block 524 from Block 522.

In Block 524, the PSBZAS control module 108 determines whether the summed probability value is greater than a first threshold value. When the summed probability value is greater than the first threshold value, then PSBZAS control module 108 generates a red indicator in Block 526. When the summed predetermined probability value is not greater than the first threshold value, then the Method 500 moves to decision Block 528.

In Block 528, the PSBZAS control module 108 determines whether the summed probability value is greater than a second threshold value. When the summed probability value is greater than the second threshold value, PSBZAS control module 108 generates an amber indicator in Block 530. When the summed probability value not greater than the second threshold value, then the Method 500 moves to Block 532. In Block 532, no alerts are generated by the PSBZAS control module 108, and the Method 500 returns to Block 502.

While the host vehicle 100 presented in the disclosure is a passenger car, it should be appreciated that the host vehicle may be that of trucks, sport utility vehicles (SUVs), recreational vehicles (RVs), motorcycles, marine vessels, and aircraft. Furthermore, while the host vehicle 100 presented in the disclosure is shown traveling in the forward direction and the object tracked behind the host vehicle is a moving target vehicle, it should be appreciated that one of ordinary skill in the art would understand how to modified the disclosed system and method for a host vehicle 100 traveling in a rearward direction, such as backing out of a parking space or a drive way, and the object behind the vehicle is a stationary object such as a mailbox or moving object such as a pedestrian.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof.

The invention claimed is:

1. A method of predicting and displaying a blind zone entry alert for a host vehicle, comprising:
 collecting information, by an exterior sensor, on an external area surrounding the host vehicle;
 analyzing the collected information, by a module, for:
  detecting a target vehicle,
  predicting a path of the target vehicle, and determining a probability that the predicted path of the target vehicle will enter a predetermined blind zone of the host vehicle; and initiating an alert, by the module, to an occupant of the host vehicle when the determined probability exceeds a predetermined threshold value; and wherein determining the probability that the predicted path of the target vehicle will enter the predetermined blind zone of the host vehicle, includes:

determining at least one driving behavior of the target vehicle;

assigning a predetermined probability value to each of the at least one driving behavior; and summing the predetermined probability value.

2. The method of claim 1, wherein initiating the alert includes one or more of an audial alert and a visual alert.

3. The method of claim 1, wherein:
the external area surrounding the host vehicle is an area rearward of the host vehicle; and
the predetermined blind zone is a side blind zone of the host vehicle.

4. The method of claim 1, wherein predicting the path of the target vehicle includes:
detecting at least one driving dynamic of the target vehicle, wherein the at least one driving dynamic includes one or more of a roadway position, a velocity, a change in velocity, and a trajectory; and
comparing the at least one driving dynamic of the target vehicle with a corresponding at least one driving dynamic of the host vehicle.

5. The method of claim 1, wherein the at least one driving behavior includes at least one of a speed greater than a predetermined speed, a multiple lane change, a lane change from a host vehicle lane with an increase in speed, remain in lane behind the host vehicle with a decrease in speed, and a tailgating event over a predetermined time.

6. The method of claim 1, wherein initiating an alert is a visual alert displayed on a rearview display monitor configured to function as a rearview mirror.

7. The method of claim 6, wherein the visual alert includes a color indicator referencing the target vehicle; wherein the color indicator includes one or more of a first color when the determined probability is between a first predetermined value range, a second color when the determined probability is between a second predetermined value range, and a third color when the determined probability is between a third predetermined value range.

8. The method of claim 1, further comprising:
determining a lane change initiative by the host vehicle, and
implementing the method starting at analyzing the collected information when the lane change initiative is determined; and
wherein the lane change initiative includes one of a turn signal activation and a command issued by an advanced driver assistance system module.

9. The method of claim 1, further comprising:
collecting occupant information, by interior sensors, on an eye glance of a vehicle operator;
analyzing the collected occupant information, by the module, and determining whether the vehicle operator is glancing at a rearview mirror; and
implementing the method starting at analyzing the collected information on an external area surrounding the host vehicle when the vehicle operator is glancing at the rearview mirror.

10. A predictive side blind zone entry system for an advanced driver assistance system (ADAS) equipped vehicle, comprising:
at least one exterior sensor configured to gather exterior data on a rearward area surrounding of the ADAS equipped vehicle;
a module configured to analyze the gathered exterior data to detect an object and determine a probability that the object will enter a predetermined blind zone of the ADAS equipped vehicle;
a human machine interface (HMI) configured to issue an alert to notify an occupant of the ADAS equipped vehicle when the determined probability exceeds a predetermined probability threshold; and
at least one interior sensor configured to collect occupant information on an eye glance of an ADAS equipped vehicle operator;
wherein the HMI is an augmented reality rearview display unit configured to display a real time mirror image of the rearward area surrounding of the ADAS equipped vehicle; and
wherein the module is further configured to analyze the collected occupant information to determine whether the eye glance of the ADAS equipped vehicle operator is in a direction toward the augmented reality rearview display unit.

11. The system of claim 10, wherein the predetermined blind zone of the ADAS equipped vehicle is a side blind zone.

12. The system of claim 10, wherein the module is further configured to instruct the augmented reality rearview display unit to render a color indicator referencing a target vehicle detected in the rearward area surrounding of the ADAS equipped vehicle, wherein the color indicator is assigned a predetermine color corresponding to a predetermined probability that the target vehicle will enter the side blind zone.

13. A method of predicting a side blind zone entry for a vehicle, comprising:
detecting an object located behind the vehicle;
predicting a path of the object relative to the vehicle;
determining a probability that the predicted path of the object will enter a side blind zone of the vehicle; and
determining an entry of the object into the side blind zone of the vehicle when the probability exceeds a predetermined threshold;
wherein predicting the path of the object includes determining a location, a speed, a change in speed, and a trajectory of the object; and
wherein determining the probability that the predicted path of the object will enter the side blind zone of the vehicle, includes one or more of:
assigning a first probability value when the speed of the object exceeds a predetermined speed;
assigning a second probability value when the trajectory of the object exhibits a multiple lane change;
assigning a third probability value when the trajectory of exhibits a lane change from immediately behind the vehicle;
assigning a fourth probability value when the change in speed of the object decreases above a predetermined deceleration rate within the same lane of the vehicle;
assigning a fifth probability value when the object is tailgating the vehicle for greater than a predetermined time period;
summing the assigned probability values; and generating a first blind zone alert when the sum of the assigned probability values exceeds a first predetermined threshold.

14. The method of claim 13, further comprising generating a second blind zone alert when the sum of the assigned probability values exceeds a second predetermined threshold.

15. The method of claim 14, wherein the first blind zone alert and the second blind zone alert are displayed as a first color and a second color, respectively, on an augmented reality rearview mirror.

* * * * *